United States Patent
Wyatt

(10) Patent No.: US 9,879,792 B1
(45) Date of Patent: Jan. 30, 2018

(54) PRESSURE RELIEF VALVE FOR CRYOGENIC LIQUID CONTAINERS

(71) Applicant: Engineered Controls International, LLC, Elon, NC (US)

(72) Inventor: Aaron Dominic Wyatt, Hillsborough, NC (US)

(73) Assignee: Engineered Controls International, LLC, Elon, NC (US)

( * ) Notice: Subject to any disclaimer, the term of this patent is extended or adjusted under 35 U.S.C. 154(b) by 118 days.

(21) Appl. No.: 14/686,186

(22) Filed: Apr. 14, 2015

Related U.S. Application Data

(60) Provisional application No. 61/979,098, filed on Apr. 14, 2014.

(51) Int. Cl.
*F16K 15/18* (2006.01)
*F17C 13/04* (2006.01)
*B65D 51/16* (2006.01)
*F16K 15/02* (2006.01)

(52) U.S. Cl.
CPC .............. *F16K 15/18* (2013.01); *B65D 51/16* (2013.01); *F16K 15/025* (2013.01); *F17C 13/04* (2013.01)

(58) Field of Classification Search
CPC .... F16K 15/18; F16K 15/025; F16K 17/0486; F16K 17/0413; F16K 17/04; F16K 15/028; F16K 17/168; F17C 13/04; B65D 51/16; Y10T 137/7932; Y10T 137/7877
USPC ...... 251/82, 322, 251, 78, 83; 137/471, 495, 137/498, 469, 514.3–514.5, 540, 514
See application file for complete search history.

(56) References Cited

U.S. PATENT DOCUMENTS

| | | | |
|---|---|---|---|
| 948,445 A | 2/1910 | Golden | |
| 1,138,338 A * | 5/1915 | Whitney | F16K 15/063 137/514.5 |
| 2,553,347 A | 5/1951 | Work | |
| 2,634,748 A * | 4/1953 | Morrison | F16K 1/00 137/523 |
| 2,686,534 A * | 8/1954 | Montelius | F16K 17/0433 137/514 |
| 3,123,092 A * | 3/1964 | Kmiecik et al. | F22B 37/446 137/469 |
| 3,695,376 A | 10/1972 | Fiedler et al. | |
| 4,480,660 A * | 11/1984 | Bayart | F16K 17/04 137/478 |
| 4,706,929 A | 11/1987 | Kalaskie et al. | |
| 5,515,884 A | 5/1996 | Danzy et al. | |
| 2011/0114203 A1 * | 5/2011 | Mazzoni | F15B 13/024 137/514 |

(Continued)

*Primary Examiner* — Marina Tietjen
(74) *Attorney, Agent, or Firm* — Neal, Gerber & Eisenberg LLP

(57) ABSTRACT

A relief valve for use in coupling to a vessel is disclosed. The valve includes a valve body having an inlet passage connected to a valve inlet, an outlet passage connected to a valve outlet, and an internal chamber. A valve seat is engageable with the inlet passage to close the valve inlet. A poppet is coupled to the valve seat, and a spring in the internal chamber is coupled to the poppet, the spring having a predetermined spring force. A vent passage in the valve body has a first end connected to the internal chamber and a second end connected to the outlet passage to permit release of pressure from the internal chamber through the valve outlet. The vent passage is formed at an oblique angle to both the inlet passage and the outlet passage.

23 Claims, 4 Drawing Sheets

(56) References Cited

U.S. PATENT DOCUMENTS

2012/0159940 A1  1/2012  Cong

* cited by examiner

PRESSURE RELIEF VALVE FOR CRYOGENIC LIQUID CONTAINERS

CROSS REFERENCE

This application claims the benefit of U.S. Provisional Patent Application Ser. No. 61/979,098 filed on Apr. 14, 2014. This prior application is incorporated herein by reference in its entirety.

BACKGROUND

Relief valves are used to control or limit the pressure in a system or vessel which can build up in the vessel. In particular, relief valves are used on vessels such as truck containers carrying cryogenic liquids such as liquefied natural gas to allow the pressurized gases to flow from the relief valve in the event of a pressure buildup to prevent failure of the container. Cryogenic liquids stored in containers pose a particular challenge because pressure is always building in the container as the cryogenic temperature is around $-295°$ F. Present pressure relief systems used with cryogenic liquid containers typically contain three relief valves: a first pressure relief valve which cycles open and closed to keep the pressure controlled, a second pressure relief valve which opens to protect the vessel if the pressure continues to build even with the first valve operating, and a third burst disc valve which discharges if the first two valves cannot handle the pressure build in the container, to protect the container from catastrophic failure.

Current first and second pressure relief valves for such systems are of the direct spring actuated type, such that once the pressure on the inlet side of the valve reaches a predetermined point (the set pressure of the valve), the seal of the seat is released and the valve begins to open to release gas through an outlet and into a release vessel. The top of the valve is sealed so that the only escape for the gases relieved is safely through the outlet. If the pressure at the inlet continues to climb, the valve will pop to a full open position and gas will flow through the outlet at the valve's rated capacity. The speed at which this popping action occurs is very fast. Current valves have an outlet at 90° from the seat and spring. This poses an issue with the performance in that once the valve is at the point where it pops, a piston effect occurs. The piston effect is caused by a compression of the air in the chamber that houses the spring and internal parts that are above the seat and poppet. When the valve pops, the poppet is forced upward rapidly, compressing the column of air in the chamber which counteracts the force pushing upwards on the poppet, urging the valve to close. This process repeats since the pressure on the inlet is constantly pushing the poppet back up. What results from this repeated up and down movement of the poppet is known as chatter. Instead of the valve opening to its full open position and remaining there for the duration of the over pressure event, it constantly opens and closes very rapidly. This means the valve will not relieve at the proper rate, and it can also be damaging to the internal parts of the valve.

SUMMARY

The present disclosure relates to an improved relief valve to control or limit the pressure which can build up in a vessel or container. More specifically, an pressure relief valve is disclosed for use with containers carrying cryogenic liquids such as liquefied natural gas to allow the pressurized gases to flow from the relief valve in the event of a pressure buildup to prevent failure of the container. The disclosed valve combats the piston effect of having a sealed upper valve end by providing an angled vent passage that connects the chamber containing the spring and internal parts with the outlet. This vent passage allows the valve to fully open, remain open, and flow at a very high capacity for its size. The size of the vent passage has been designed as large enough to provide adequate ventilation to relieve chamber pressure and to prevent chatter, but not so large that it affects the compactness of the overall valve. The disclosed valve optionally includes a handle to provide a manual open feature to allow ice and debris to be discharged manually in the event that debris becomes lodged in the seat.

Other objects, advantages, features, properties and relationships of the invention will be obtained from the following detailed description and accompanying drawings which set forth illustrative embodiments that are indicative of the various ways in which the principles of the invention may be employed.

DETAILED DESCRIPTION

The description that follows describes, illustrates and exemplifies one or more embodiments of the present invention in accordance with its principles. This description is not provided to limit the invention to the embodiments described herein, but rather to explain and teach the principles of the invention in order to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

Figure 1:
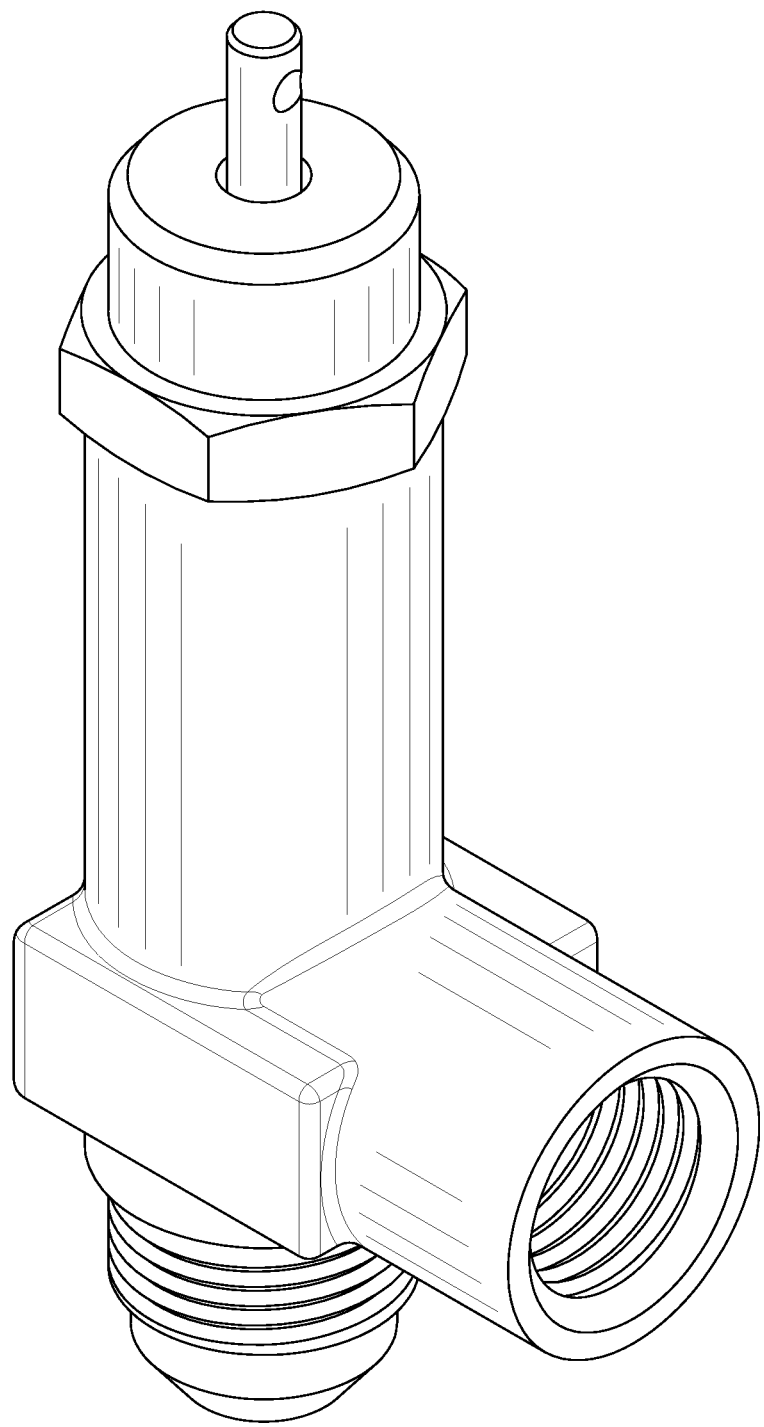
FIG. 1 is perspective view of a prior art relief valve.

Valves used with cryogenic liquid containers have a sealed upper end so that the only escape for the gases is safely through valve outlet 50 to a relief vessel (not shown). In existing valves as seen in FIG. 1, a piston effect is caused by a compression of the air in the chamber that is above the valve seat and poppet. When the valve pops open at the preset pressure, the poppet is forced upward rapidly, compressing the column of air in the chamber which counteracts the force pushing upwards on the poppet and the valve will close. This process repeats since the pressure on the inlet is constantly pushing the poppet back up. What results is known as chatter. Instead of the valve opening to its full open position and remaining there for the duration of the over pressure event, it constantly opens and closes very rapidly. This means the valve will not relieve at the proper rate, and can also be damaging to the internals of the valve.

Figure 2:
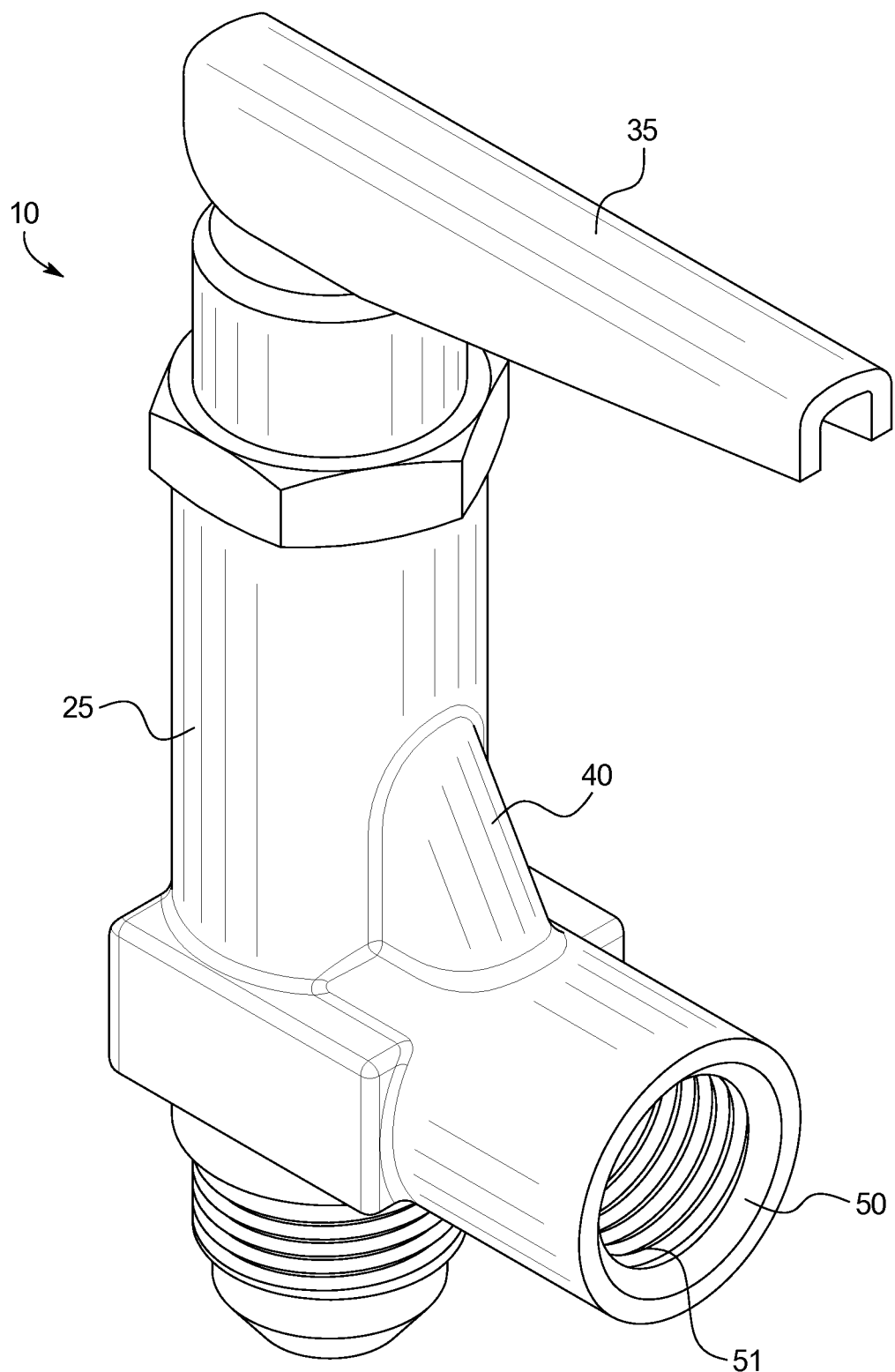
FIG. 2 is a perspective view of a relief valve in accordance with the disclosure herein.
Figure 3:
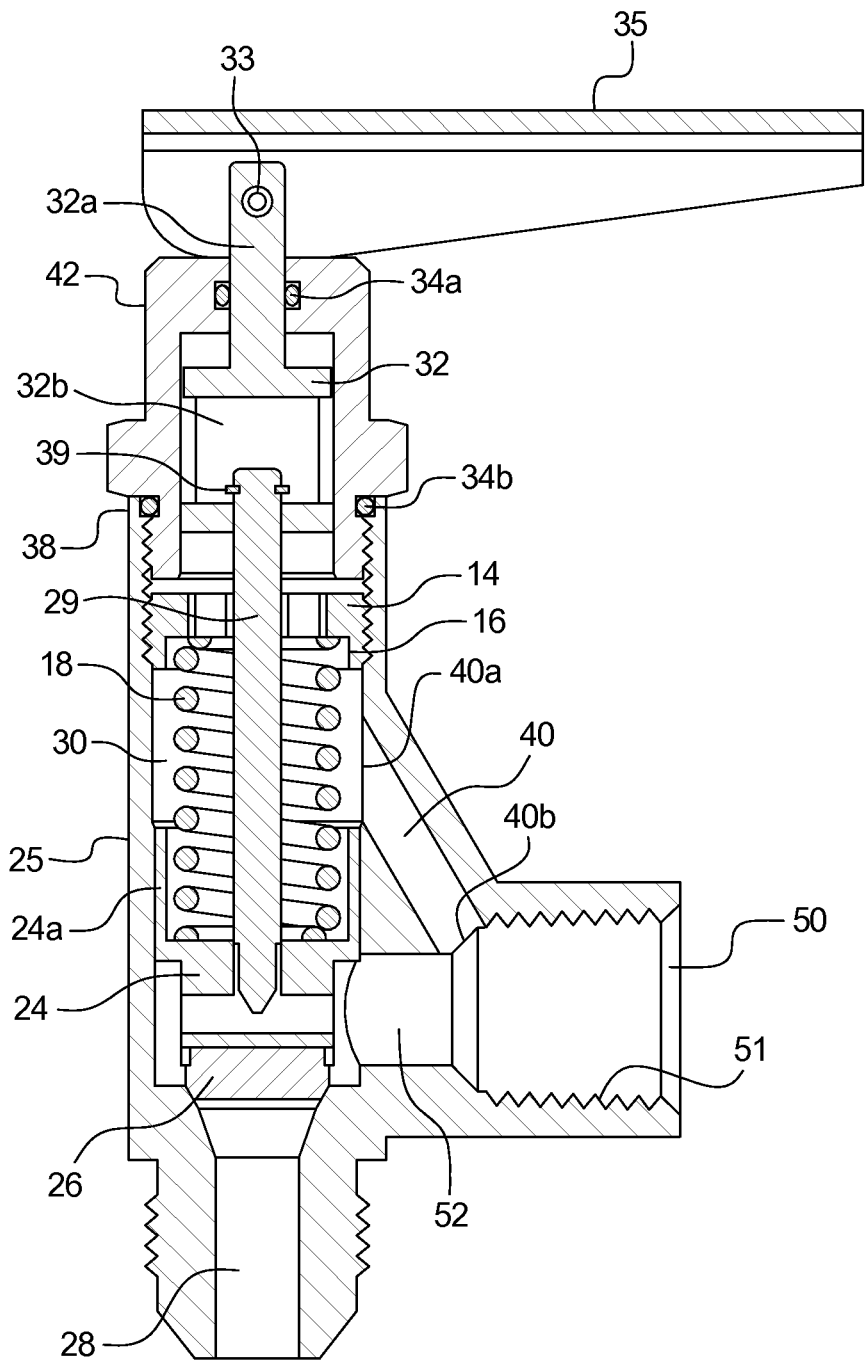
FIG. 3 is a cross-sectional view of the relief valve of FIG. 2.
Figure 4:
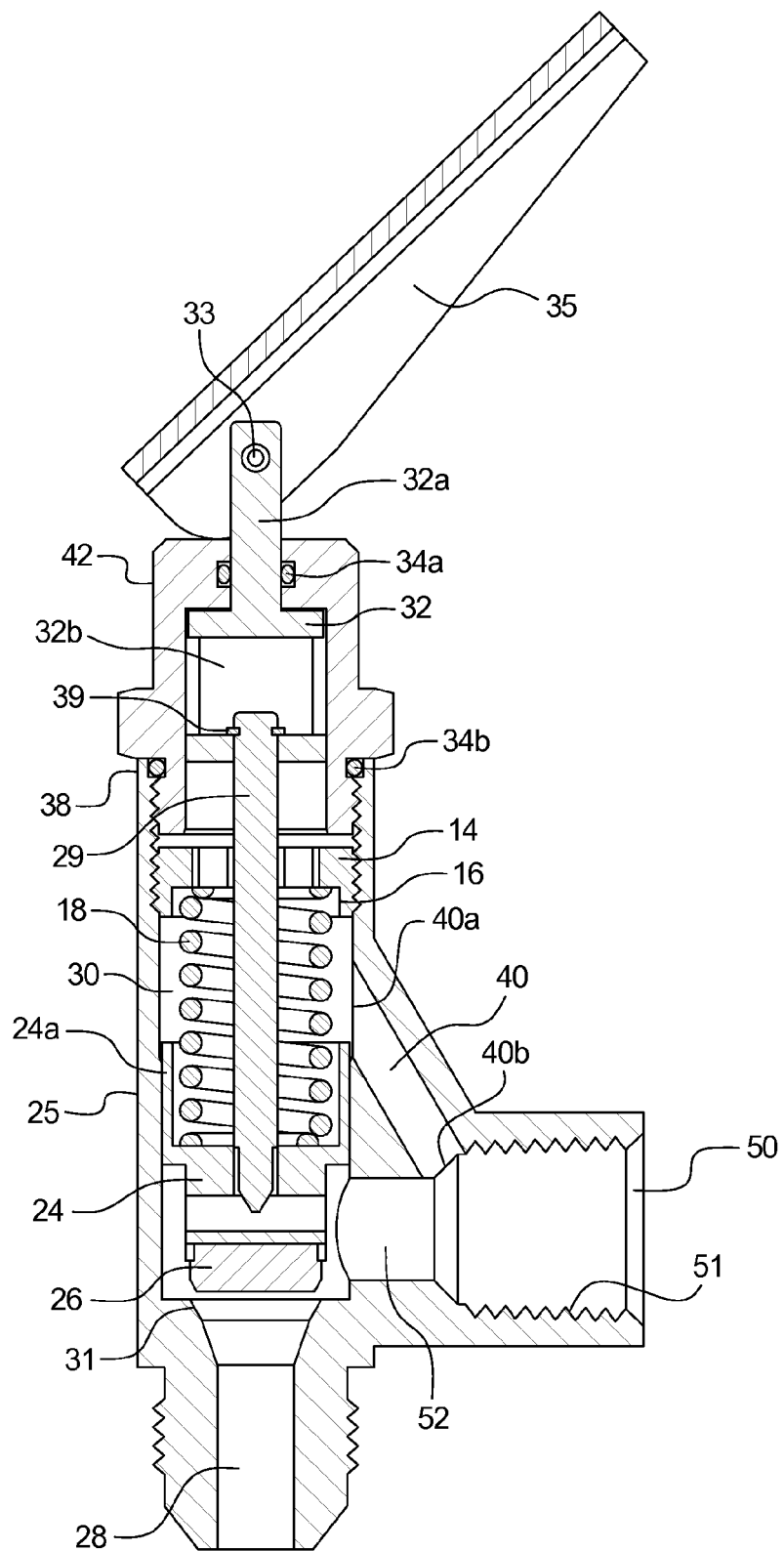
FIG. 4 is a cross-sectional view of the relief valve of FIG. 2, with the handle in an open position.

FIGS. 2, 3 and 4 show an embodiment of an improved pressure relief valve 10 in accordance with the present invention. The relief valve 10 is a spring-loaded poppet relief-type valve coupled to a container carrying cryogenic liquids such as liquefied natural gas to allow the pressurized gases to flow from the relief valve 10 in the event of a pressure buildup to prevent failure of the container. Relief valve 10 may be used as a first valve or a second valve of a three-valve relief system for cryogenic containers and comprises a valve body 25 having a top opening portion 38, a valve inlet passage 28, a valve outlet passage 52 terminating in valve outlet 50, where the longitudinal axes of valve inlet passage 28 and valve outlet passage 52 are preferably disposed at a right angle to one another. An internal chamber 30 extends from top opening portion 38 to valve inlet passage 28 and in the depicted embodiment, a valve cap 42, which may also be referred to as a dust cap or bonnet, is mounted in the top opening portion 38. Relief valve 10 is designed to open at a preset pressure, such that when the pressure in the container exceeds the preset pressure of the relief valve 10, the relief valve 10 will open to allow the pressure in the container to be reduced by allowing gases to exit through valve outlet 50. Outlet 50 may be an NPT outlet, and includes internal threads 51 for providing for a seal between valve outlet 50 and a relief vessel (not shown). The internal components of relief valve 10 are located in internal chamber 30. An adjusting screw 14 is threaded into internal chamber 30 and includes an extension forming a spring retainer 16 enclosing the top of a spring 18. Preset pressure can be adjusted using adjusting screw 14 to adjust the location of spring retainer 16 to select the desired force of spring 18 according to the desired relief pressure for the particular contents and for use as for first or the second of the three container valves. For example, in a container for liquefied natural gas (LNG), first valve may be set at a pressure of 230 PSIG, and second valve at a pressure of 350 PSIG. When the pressure in the container exceeds the preset pressure of relief valve 10, the force of the pressure overcomes the spring 18 force, allowing a movable poppet 24 coupled to a valve seat 26 to lift away from the valve inlet passage 28 and allow gases from the container to flow out of the system through the outlet 50 and into a release vessel. Poppet 24 includes an upwardly extending extension 24a to guide spring 18 and ensure proper movement of poppet 24 within internal chamber 30.

As seen in FIGS. 2 and 3, the relief valve 10 of the present invention overcomes the piston effect by providing an angled vent passage 40 that connects internal chamber 30 containing spring 18 and other internal parts with valve outlet 50. Pressure buildup from poppet 24 is relieved by flowing through the vent passage 40, thus preventing any chatter caused by the opening and closing caused by the counteracting pressure force downward on the poppet 24. Vent passage 40 is shown as being at an angle of approximately 30 degrees from the vertical (i.e., from the longitudinal direction of valve inlet passage 28) as this permits a first end 40a of vent passage 40 to open into internal chamber 30 above poppet 24, and avoids interference therewith. Similarly, the opposite end 40b of vent passage 40 exits into valve outlet passage 52 at a location where it avoids internal threads 51, thereby ensuring that vent passage 40 is not blocked. It will be understood that other angles can be used depending on the size of the valve or its components. Vent passage 40 thus allows relief valve 10 to fully open, remain open, and flow at a very high capacity for its size. Vent passage 40 allows the pressure in the container (not shown) to which valve inlet passage 28 is connected to be relieved at the proper rate, protecting the container and its contents from failure. It also prevents damage to spring 18 and other internal components of relief valve 10 that can be caused by chatter. The size of the vent passage 40 is designed as large enough to provide adequate ventilation to prevent chatter, but not so large that it affects the compactness of the overall relief valve 10.

In the embodiment depicted in FIGS. 2, 3 and 4, a valve cap 42 is disposed in the opening formed at top 38 of valve body 25. An optional handle 35 is coupled to the top of relief valve 10 to provide the additional feature of allowing the clearing of ice or debris from the valve. As shown most clearly in FIGS. 3 and 4, a connector 32 is slidably disposed inside valve cap 42 and is connected to stem 29 by means of a standard connector, such as a stainless steel e-clip 39, and an extension 32a extends upwards to engage handle 35 by means of a pin connector 33. It will be understood that other types of connectors may be used. It will be understood that appropriate seals will also be used. These are depicted herein as o-ring seal 34a sealing connector extension 32a to valve cap 42 and which is preferably composed of Teflon-impregnated Fluorosilicone and the lower o-ring seal 34b which is preferably composed of Fluorosilicone. It will be understood that other types of seals may be appropriate depending on the materials used and the intended use of the valve.

When handle 35 is in its closed position (FIGS. 2 and 3), relief valve 10 operates as described above. An open space 32b is formed internally to connector 32 to avoid interference with stem 29 during such normal operation of relief valve 10. Due to the nature and intended service of this valve, there is a possibility that ice could form around the poppet 24 and at the outlet 50. There may also be the possibility that debris could collect in these areas as well. In order to provide an easy way to remove the unwanted ice/debris, relief valve 10 can be manually opened by lifting the handle 35 (FIG. 4). As noted, stem 29 extends through internal chamber 30 and is coupled to both connector 32 and poppet 24, such that when handle 35 is lifted, stem 29 is moved upwardly and puts upward tension on spring 18, moving valve seat 26 away from seating surface 31 of valve inlet passage 28. Handle 35 in the open position thus allows gas to flow out of relief valve 10 from through vent passage 40 and outlet 50. This allows gas to flow around the poppet 24 and through the outlet 50, taking with it any ice/debris which has collected in internal chamber 30. Once it is determined that relief valve 10 is clear, the handle 35 may then be released and by the force of the spring 18 the stem 29 will lower, handle 35 will return to its down position, and poppet 24 will engage valve seat 26 against seating surface 31 to seal valve inlet passage 28 and close relief valve 10. It will be understood that other designs and shapes of handle 35 could be used in accordance with the spirit and teachings of this disclosure.

In the depicted embodiment, valve body 25 is a brass forging and other components such as valve cap 42 are made of brass, with certain components such as handle 35, stem 29 and spring 18 being composed of stainless steel. Other materials may be used as appropriate depending on the intended uses of the valve.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any equivalent thereof.

What is claimed is:

1. A relief valve for use in coupling to a vessel, the relief valve comprising:

a valve body having an inlet passage connected to a valve inlet, an outlet passage connected to a valve outlet, and an internal chamber;

a valve seat disposed inside the valve body and engageable with a seating portion of the inlet passage to close the valve inlet;

a poppet capable of translation within the internal chamber and coupled to the valve seat;

a spring disposed in the internal chamber and coupled to the poppet, the spring having a predetermined spring force, wherein when a fluid pressure at the inlet passage overcomes the predetermined spring force, the valve seat moves away from the seating portion of the inlet passage and allows fluid to pass from the valve inlet to the internal chamber and the valve outlet;

a vent passage formed in the valve body and having a first passage end connected to the internal chamber and a second passage end connected to the outlet passage, the vent passage allowing a release of pressure from the internal chamber through the valve outlet;

a stem extending entirely through the spring and having a first stem end and a second stem end, the first stem end being engaged to the poppet;

a connector assembly slidably engaged to the second stem end, the second stem end being captured in the connector assembly via a clip, the connector assembly being configured to permit removal of the clip;

an adjustment screw disposed between the spring and the connector assembly and engaged with the valve body and with the spring, the stem extending through the adjustment screw; and a handle coupled to the connector assembly, the handle movable between a closed position where the stem and the poppet are in a neutral position permitting normal operation of the relief valve, and an open position, wherein when the handle is moved to the open position, the stem pulls the poppet toward the handle to move the valve seat away from the inlet passage, thereby permitting fluid to flow through the valve inlet and into the internal chamber and the valve outlet, and wherein, when the handle is released, a spring force provided by the spring against the poppet urges the handle to the closed position.

2. The relief valve of claim 1, wherein the inlet passage is disposed at a right angle to the outlet passage, and the vent passage is formed at an oblique angle to both the inlet passage and the outlet passage.

3. The relief valve of claim 1, further comprising a valve cap mounted to an upper end of the valve body opposite the valve inlet, wherein a first portion of the connector assembly is disposed in the valve cap to engage the stem and a second portion of the connector assembly extends through the valve cap to engage the handle.

4. A valve comprising:

a valve body comprising an inlet, an outlet, an internal chamber, and a seating surface;

a moveable valve seat disposed within the valve body, the valve seat configured to move between a closed position where the valve seat is engaged with the seating surface and an open position where the valve seat is disengaged from the seating surface;

a stem having a first end and a second end, the first end being coupled to the valve seat;

a connector assembly slidably engaged to the second end of the stem, the second end being captured in the connector assembly via a clip, the connector assembly being configured to permit removal of the clip;

a handle moveable between a first position and a second position, the second position causing the stem to pull the valve seat to the open position;

a spring biasing the valve seat toward the first position and biasing the handle away from the second position and toward the first position; and an adjustment screw disposed between the spring and the connector assembly and engaged with the valve body and with the spring, the stem extending entirely through the adjustment screw.

5. The valve of claim 4, wherein the stem is fixed with respect to the valve seat such that the valve seat and the stem move as a unit.

6. The valve of claim 5, wherein the adjustment screw comprises a spring retainer to receive the spring.

7. The valve of claim 6, wherein in an absence of external force acting upon the valve, the spring retains the handle in the first position.

8. The valve of claim 5, wherein the handle is disposed above the valve seat such that a central axis of the valve seat intersects the handle.

9. The valve of claim 4, wherein:

the connector assembly comprises a moveable base defining an inner chamber;

the clip is secured to the stem, disposed within the inner chamber, and is configured to stop against an inner surface of the moveable base;

the clip is stopped against the inner surface of the moveable base when the valve seat is in the open position and the handle is in the second position; and the clip is spaced from the inner surface of the moveable base when the valve seat is in the closed position and the handle is in the first position.

10. The valve of claim 9, wherein the connector assembly comprises a rod fixed with respect to the moveable base, the rod being coupled to the handle.

11. The valve of claim 10, wherein the moveable base is configured to slide in a direction collinear with a major axis of the stem and the handle is configured to rotate with respect to the rod.

12. The valve of claim 4, wherein the valve body comprises a cap, the cap comprising an outer bearing surface for the handle, the handle configured to bear on the outer bearing surface when in the second position.

13. The valve of claim 4, wherein:

the spring compresses the handle against the valve body when the handle is in the second position; and the spring compresses the valve seat against the valve body when the valve seat is in the closed position.

14. The valve of claim 4, further comprising:

a transverse pin extending through the handle, the transverse pin being configured to convert rotational motion of the handle into linear motion of the valve seat.

15. A valve comprising:

an inlet, an outlet, an internal chamber, a seating surface, and a planar top surface;

a moveable valve seat, the valve seat configured to move between a closed position where the valve seat is engaged with the seating surface and an open position where the valve seat is disengaged from the seating surface;

a stem having a first end and a second end, the first end being coupled to the moveable valve seat;

a connector assembly slidably engaged with the second end of the stem, the second end being captured in the connector assembly via a clip, the connector assembly being configured to permit removal of the clip;

a handle moveable between a first position and a second position, the second position of the handle causing the valve seat to move to the open position; and a spring configured to cause the handle to bear against the top surface when the handle is in the second position and the handle is thus causing the valve seat to move away from the inlet.

16. The valve of claim 15, wherein the top surface is exposed to ambient and serves as an outer wall of the valve.

17. The valve of claim 15, wherein the handle comprises a planar handle surface and an arced handle surface, the planar handle surface being configured to contact the top surface when the handle is in the first position, the arced handle surface bearing against the top surface when the handle is in the second position.

18. The valve of claim 15, wherein:

the connector assembly comprises a moveable base defining an inner chamber;

the clip is secured to the stem, disposed within the inner chamber, and is configured to stop against an inner surface of the moveable base when the handle is in the second position.

19. The valve of claim 18, wherein the moveable base is linearly slidable, but not rotatable.

20. The valve of claim 18, wherein the handle is rotatable between the first position and the second position; and the connector assembly is configured to convert rotational motion of the handle into linear motion of the clip.

21. The valve of claim 18, wherein when the handle is in the first position, the clip is spaced from the inner surface of the moveable base.

22. The valve of claim 18, wherein the connector assembly comprises:

a rod extending from the moveable base and a pin extending through the rod and the handle, the pin being configured to convert rotational motion of the handle into linear motion of the moveable base.

23. A relief valve for use in coupling to a vessel, the relief valve comprising:

a valve body having an inlet passage connected to a valve inlet, an outlet passage connected to a valve outlet, an internal chamber, the inlet passage comprising a seating surface;

a cap secured to the valve body and comprising a planar top surface;

a moveable valve seat disposed inside the valve body, the valve seat configured to move between a closed position where the valve seat is engaged with the seating surface of the inlet passage to close the valve inlet and an open position where the valve seat is disengaged from the seating surface;

a poppet capable of translation within the internal chamber and coupled to the valve seat;

a spring disposed in the internal chamber and coupled to the poppet, the spring having a predetermined spring force, wherein when a fluid pressure at the inlet passage overcomes the predetermined spring force, the valve seat moves away from the seating surface of the inlet passage and allows fluid to pass from the valve inlet to the internal chamber and the valve outlet;

a vent passage formed in the valve body and having a first passage end connected to the internal chamber and a second passage end connected to the outlet passage, the vent passage allowing a release of pressure from the internal chamber through the valve outlet;

a stem extending through the spring and having a first stem end and a second stem end, the first stem end being engaged to the poppet;

an adjustment screw disposed between the spring and the cap and engaged with the valve body and with the spring, the stem extending through the adjustment screw; and a handle coupled to the second stem end, the handle movable between a first position where the stem and the poppet are in the closed position permitting normal operation of the relief valve, and a second position, wherein when the handle is moved to the second position, the stem pulls the poppet and the valve seat toward the open position, thereby permitting fluid to flow through the valve inlet and into the internal chamber and the valve outlet, and wherein, when the handle is released, a spring force provided by the spring against the poppet urges the handle to the first position;

wherein the spring biases the valve seat toward the closed position and biases the handle toward the first position, the spring being configured to cause the handle to bear against the planar top surface when the handle is in the second position.

* * * * *